United States Patent [19]
Cutler

[11] Patent Number: 5,081,159
[45] Date of Patent: Jan. 14, 1992

[54] METHOD FOR SEPARATING ION EXCHANGE RESINS USING AMINE SALT SOLUTIONS AND COMPOSITION FORMED THEREIN

[76] Inventor: Frances M. Cutler, 17701 Anglin La., Tustin, Calif. 92680

[21] Appl. No.: 114,034

[22] Filed: Oct. 29, 1987

[51] Int. Cl.$^5$ .............................................. L08J 5/20
[52] U.S. Cl. ........................................ 521/26; 521/28
[58] Field of Search ........................... 556/13, 14, 16; 526/277; 521/27, 26, 28

[56] References Cited

U.S. PATENT DOCUMENTS

| | | | |
|---|---|---|---|
| 2,366,651 | 1/1945 | Raulings | 521/26 |
| 3,385,787 | 5/1968 | Crits et al. | 210/673 |
| 3,582,504 | 6/1971 | Salem et al. | 260/2.1 |
| 4,511,675 | 4/1985 | Auerswald et al. | 210/670 |
| 4,652,352 | 3/1987 | Saieva | 521/26 |
| 4,820,421 | 4/1989 | Auerswald | 210/670 |

FOREIGN PATENT DOCUMENTS

61-234951  10/1986  Japan ........................ 521/26

OTHER PUBLICATIONS

U.S. Application Ser. No. 014,797, Filed Feb. 13, 1987.
Seprex TM Process Used in Power Plants in the U.S. and sold by Grover Water Division of Ecodyne.
Resin Density Determination-Water Pycnometer Method, letter from Dow Chemical dated Nov. 18, 1983, U.S.A.
Salem et al., A Unique Advance in Condensate Polishing at Central Illinois Public Service, The International Water Conference of the Engineers' Society of Western Pennsylvania, 44th Annual Meeting, Oct. 1983, Pittsburgh, Pa.

*Primary Examiner*—Thurman K. Page
*Assistant Examiner*—Peter F. Kulkosky
*Attorney, Agent, or Firm*—Jeffrey G. Sheldon

[57] ABSTRACT

In a method for separating and regenerating a mixed bed of exhausted anion and cation resins, substantially all of the cation and anion resins in the bed are separated by their respective buoyancies using an amine salt solution having a density between the densities of the anion and cation resins. A composition formed during this method comprises the anion resin, the cation resin, and the amine salt solution.

26 Claims, 1 Drawing Sheet

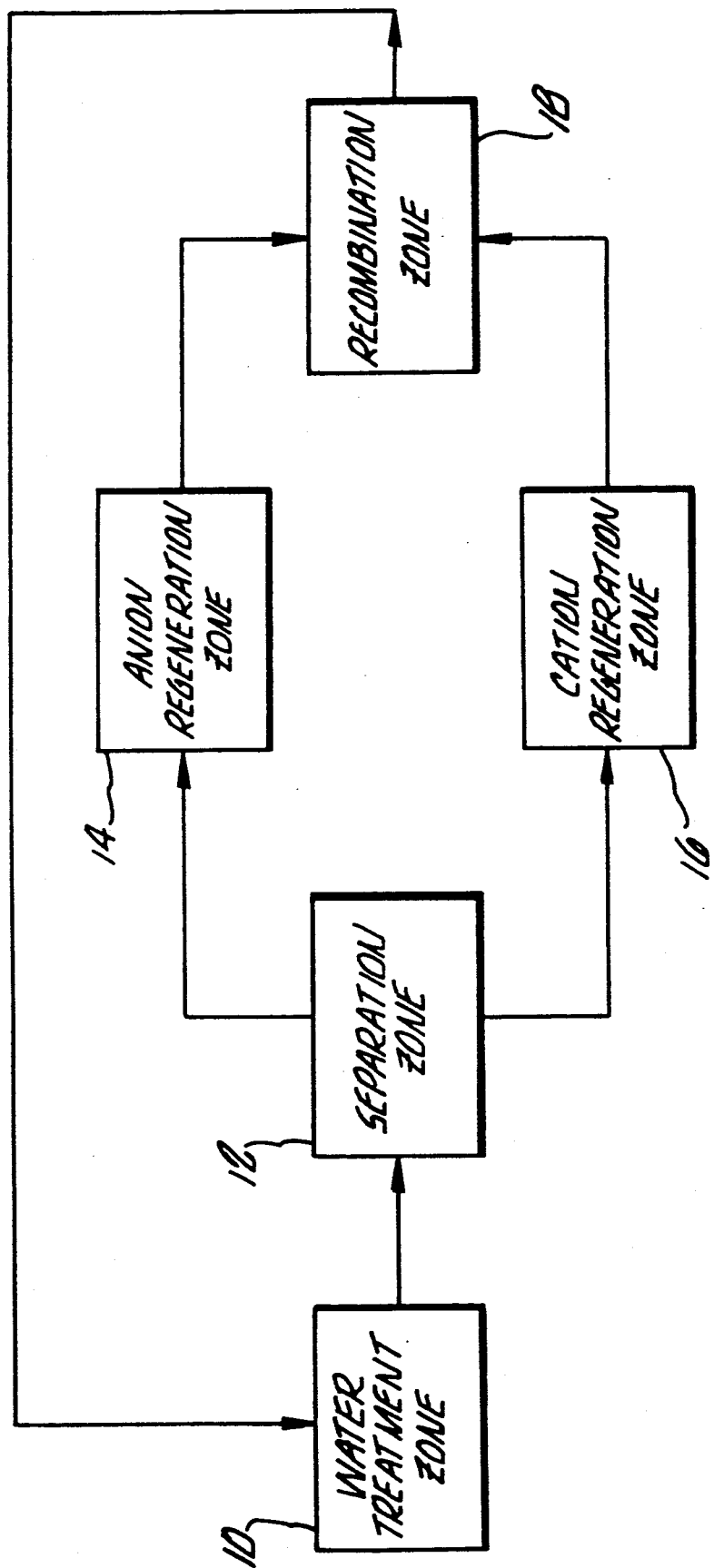

METHOD FOR SEPARATING ION EXCHANGE RESINS USING AMINE SALT SOLUTIONS AND COMPOSITION FORMED THEREIN

BACKGROUND

The present invention is directed to a method for separating and regenerating a mixed bed of anion and cation resins and to a composition formed during the practice of the method.

Mixed bed systems containing anion and cation exchange resins have many industrial applications. A primary application of such a system is in the purification of water for condensate recirculation systems used to drive steam turbines in fossil fuel and nuclear facilities. It is essential that this water be of an extremely high purity level in order to avoid any adverse effects on the surfaces of turbine blades, boilers, pipes, and other parts of the facility.

A particular problem with mixed bed ion exchange systems is the production of ion leakage. Ion leakage can result from the failure of the ion exchange resins in the mixed bed to remove ions from the water and the passage of the unremoved ions past the mixed bed. In addition, the introduction into the water of undesired ions by the resins themselves can also contribute to ion leakage.

The leakage of regenerant chemical ions from the resins arises primarily from the difficulty in perfectly separating the anion and cation resins in the mixed bed prior to regeneration of the resins. A conventional technique for effecting such separation is by passing water upwardly through the resins. This upward flow of water stratifies the resins by carrying the less dense anion exchange resin to the top of the separation vessel, while the denser cation exchange resin sinks to the bottom of the separation vessel. While this method is effective for separating the bulk of the resins into two stratas or layers, perfect separation cannot be achieved. A primary source for imperfect separation is resin fines that are produced during handling of the resins. Since upflow separation depends on the particle size as well as the density of the resins, the cation exchange resin fines do not sink to the bottom of the separation vessel, but are carried upwardly with the anion exchange resin. When the resins are subsequently isolated from one another, and the anion exchange resin is regenerated with sodium hydroxide, sodium ions can be introduced into the ion exchange sites in the entrained cation resin. When the resins are returned to the service vessel, the sodium ions are displaced from the cation resin by any ions present in the influent water that have a higher selectivity or affinity for the cation resin, e.g., ammonium. The displaced sodium ions are thereby introduced into the water being treated, producing sodium leakage.

Also, anion resins can be entrapped among the cation resin during the passage of water upwardly through the mixed bed of resins. When this occurs, the regeneration of the cation resin with sulfuric acid exhausts the entrained anion resin to the sulfate and bisulfate forms. When the resins are returned to the service vessel, the sulfate ions are introduced into the water being treated, thereby producing sulfate leakage. It is believed that sulfate leakage from the anion resin is primarily due to the bisulfate ions being driven off the anion resin by ammonium hydroxide which is typically used to control the pH of the influent water.

In addition to not achieving perfect separation, the conventional technique for separating anion and cation resins possesses several further disadvantages. For example, the size of the cation resin capable of being employed in the mixed bed is unduly restricted. This is because resin size, as noted above, as well as resin density, are factors which contribute to the efficiency of the conventional backwash separation procedure. Accordingly, the conventional backwash procedure requires that the cation resin be larger than the anion resin. This restriction limits the efficiency of the cation resin since larger resin size particles have less surface area per unit volume and therefore exhibit slower ion transfer rates or kinetics.

Furthermore, the vessel or zone through which the water is passed upwardly to stratify the resins typically has a fixed anion resin takeoff location or point. Accordingly, the bulk volume of cation resin employed in the mixed bed is restricted since the bulk volume of the cation resin must be sufficient to occupy the volume of the zone below the anion resin takeoff point, thereby causing the upwardly lifted anion resin to occupy a volume above the anion takeoff point.

Another commercially used method for separating and isolating exhausted anion and cation exchange resins is disclosed in U.S. Pat. No. 3,582,504. The method of U.S. Pat. No. 3.528.504 comprises first separating the resins in the conventional manner by passing a liquid upwardly through the resins to position the anion resin in an upper layer and the cation resin in a lower layer. The layers are then conventionally isolated from one another so that the anion exchange resin occupies an anion exchange resin zone and the cation exchange resin occupies a cation resin zone. It is estimated that the anion resin in the anion exchange resin zone generally contains less than about 10 percent volume/volume (% v/v) entrained cation resin and more typically less than about 5% v/v entrained cation resin.

The process of U.S. Pat. No. 3,582,504 is characterized in that an intermediate-density liquid is then delivered to the anion exchange resin to remove the entrained cation resin from the anion resin zone. This intermediate-density liquid has a density intermediate between the densities of the anion exchange resin and the cation exchange resin, i.e., greater than the anion exchange resin and less than the cation exchange resin. The intermediate density liquid is delivered to the anion exchange resin in an amount sufficient to cause the anion resin to float and the cation resin to sink. The separated anion exchange resin is then isolated from the entrained cation exchange resin.

U.S. Pat. No. 3,582,504 discloses that numerous intermediate-density liquids, e.g., organic liquids and aqueous solutions of inorganic compounds that have a density intermediate between the anion and cation exchange resins, can be employed. U.S. Pat. No. 3,582,504 specifically mentions sodium sulfate and alkali metal hydroxide solutions, the most preferred aqueous salt solution being sodium hydroxide.

There are several distinct disadvantages with the separation process of U.S. Pat. No. 3,582,504. First, the process employed in U.S. Pat. No. 3,582,504 still separates the bulk of the anion and cation resins by the conventional technique of passing water upwardly through the resins. As noted above, this separation process can leave entrapped anions in the cation resin and thereby can continue to contribute to sulfate leakage due to exhausting the entrained anion resins with sulfuric acid. Second, the cation resin entrained in the separated anion resin can be exhausted, e.g., to sodium, during the separation of the entrained cation resin from the anion resin, e.g., with sodium hydroxide. Even though the exhausted cation resin can later be regenerated with the cation resin, it is very difficult to fully regenerate a cation resin that has been exhausted by contact with sodium hydroxide. Therefore, the exhausted cation resin can contribute to sodium leakage.

Third, because conventional backwashing is employed to separate the bulk of the anion and cation resins, the size of the cation resin capable of being employed in the mixed resin bed continues to be unduly restricted.

Fourth, the bulk volume of cation resin employed in the mixed bed also continues to be unduly restricted because of the continued use of the fixed anion resin takeoff point in the backwash separation procedure.

Thus, there is a need for a process for separating the bulk of the anion and cation resins that (a) yields better separation of these resins; (b) does not limit either the size or bulk volume of resins that can be employed in a mixed bed; and (c) does not adversely exhaust either the cation or the anion resin.

SUMMARY

The present invention satisfies this need. The method of the present invention (a) enables substantially all of the anion and cation resins to be separated from one another, (b) does not restrict either the size or the bulk volume of the resins that can be employed in a mixed resin bed, and (c) does not adversely exhaust either the cation or the anion resin.

A method according to the present invention for separating and regenerating a mixed bed of anion and cation resins employs an amine salt solution to effectively separate substantially all of the anion and cation resins. The amine salt solution employed has a density greater than the density of the anion resin and less than the density of the cation resin. Accordingly, the anion resin floats and the cation resin sinks in the solution.

Because substantially all of the anion and cation resins are separated due to their respective buoyancies in the amine salt solution, any desired anion and cation particle size can be employed in the mixed bed. Similarly, because the position of the anion resin layer in a separation vessel or zone can easily be adjusted by the volume of amine salt solution introduced into the separation zone, the ability to efficiently separate the anion and cation resins is no longer dependent on the bulk volume of the cation resin employed in the mixed bed. Therefore, the separation method of the instant invention enables any convenient bulk volume of cation resin to be employed in the mixed bed. Another benefit of the method of the present invention is that the cation resin is at least partially regenerated by the amine salt solution without adversely exhausting the anion resin.

More particularly, the method of the instant invention comprises the steps of (a) introducing the amine salt solution into a separation zone containing the mixed bed of resins thereby causing the anion resin to float and the cation resin to sink in the solution; (b) separating the anion and cation resins so that substantially all of the anion resin occupies an anion regeneration zone and substantially all of the cation resin occupies a cation regeneration zone; (c) rinsing the cation resin in the cation regeneration zone and the anion resin in the anion regeneration zone to displace the amine salt solution from the resins; and (d) regenerating the anion resin. In general, the mixed bed of resins comprises at least about 25 (% v/v) cation resin.

In typical power plant installations, prior to step (a), the mixed bed of anion and cation resins is transferred from a service or water treatment zone to the separation zone. Optionally, the cation resin can be further regenerated, if necessary, to achieve a desired degree or form of regeneration.

When the separation zone and the cation regeneration zone are located in the same vessel, it is preferred that after step (b) the method further comprises the steps of (i) introducing additional amine salt solution into the vessel housing the separation and cation regeneration zones, (ii) allowing any residual anion resin in the vessel to be floated by the solution, and (iii) transferring substantially all of the floated residual anion resin from the vessel to the anion regeneration zone. Alternatively, the separation zone and the anion regeneration zone can be located in the same vessel.

Although not necessary for purposes of separating the anion from the cation resin, a backwash procedure is preferably employed prior to step (a) to remove contaminants from the resins.

To avoid exposing the resins to osmotic shock, it is preferred that prior to step (a) an initial amine salt solution be introduced into the mixed resins. The initial amine salt solution has a density less than the densities of the anion and cation resins. The density of the amine salt being introduced into the mixed resins is then increased so that the amine salt solution being introduced into the mixed resins has a density of the amine salt solution of step (a).

The amine salt solution comprises an amine salt having a cation moiety and an anion moiety. The cation moiety is selected from the group consisting of hydrazine, cyclohexamine, morpholine, ammonium, and mixtures thereof. Preferably, the cation moiety is ammonium. The anion moiety is selected from the group consisting of sulfate, bisulfate, carbonate, bicarbonate, citrate, nitrate, oxalate, acetate, pentaborate, and mixtures thereof. Preferably, the anion moiety is selected from the group consisting of sulfate, bisulfate, carbonate, bicarbonate, citrate, and mixtures thereof. A preferred amine salt solution is an ammonium sulfate solution.

Although the anion resin generally has a density less than the density of the cation resin, it is believed that there are certain situations wherein the anion resin can have a density greater than the density of the cation resin. Nevertheless, the amine salt solution can be employed to separate the anion and cation resins irrespective of which resin is the denser species provided that the anion and cation resins differ in their respective densities.

The method of the instant invention has significant advantages. It yields a better separation of the anion and cation resins it does not restrict the size or bulk volume of either the anion or cation resin used in the mixed bed, and it does not adversely exhaust either the anion or cation resin.

DRAWINGS

These and other features, aspects, and advantages of the present invention will become better understood with reference to the following description, appended claims, and accompanying drawing wherein FIG. 1 is a schematic diagram of a process according to the present invention.

DESCRIPTION

This invention is directed to a method for separating a mixed bed of anion and cation resins and, in particular, to a method for separating and regenerating a mixed bed of exhausted anion and cation resins. In general, mixed beds comprise at least about 25 percent volume/volume (% v/v) cation resin. Because amine treatment is typically used for corrosion control, the mixed beds typically comprise greater than about 50% v/v cation resin. In addition, the invention is directed to a composition produced during the separation of the mixture of cation and anion resins.

Exemplary cation resins that can be separated and regenerated in accordance with the present invention include, but are not limited to, sulfonic polystyrene and carboxylic resins. Exemplary anion resins that can be separated and regenerated in accordance with the present invention include, but are not necessary limited to, Type I, Type II polystyrene, polyamide, phenolic, polyamine, epoxy polyamine, acrylic polyamine, and macroreticular tertiary amine resins. In general, the anion resins have a density less than about 1.2 and the cation resins have a density greater than about 1.2. Exemplary specific gravities for both new and previously used anion resins which have been exhausted by sulfate are set forth in Table I, infra.

TABLE I

| | Anion Resin[1] | Specific Gravity[2] | Temp, °C. |
|---|---|---|---|
| A | Ambersep 900[4] (used) | 1.091 | NA[3] |
| A | Ambersep 900 (new) | 1.088 | 20.4 |
| B | Dowex TGA[5] (used) | 1.131 | 19.8 |
| B | Dowex TGA (new) | 1.124 | 20.4 |
| C | Macroporous (used) | 1.106 | 19.8 |
| C | Macroporous (new) | 1.132 | 19.9 |
| D | Macroporous (new) | 1.096 | 21.0 |
| E | Dowex SBR-C[6] (new) | 1.102 | 21.0 |

[1] All anion resins listed are Type I resins.
[2] Specific gravity determined according to the Dow Water Pycnometer Method (1983).
[3] NA denotes not available.
[4] Ambersep 900 brand Type I resin is manufactured by Rohm & Haas Co., Philadelphia, Pennsylvania.
[5] Dowex TGA brand Type I, gel resin is manufactured by Dow Chemical Co., Midland, Michigan.
[6] Dowex SBR-C brand Type I, gel resin is manufactured by Dow Chemical Co., Midland, Michigan.

The method of the present invention is characterized by the use of an amine salt solution to separate the bulk of the cation and anion resins. The amine salt solution comprises an amine salt having a cation moiety and an anion moiety. Exemplary cation moieties include, but are not necessarily limited to, hydrazine, cyclohexamine, morpholine, ammonium, and mixtures thereof. Preferably, the cation moiety is ammonium. Exemplary anion moieties include, but are not limited to, sulfate, bisulfate, carbonate, bicarbonate, citrate, nitrate, oxalate, acetate, pentaborate, and mixtures thereof. Preferably, the anion moiety is selected from the group consisting of sulfate, bisulfate, carbonate, bicarbonate, citrate, and mixtures thereof. A preferred amine salt solution is an ammonium sulfate salt solution. Tables II-VI set forth the densities of exemplary amine salt solutions as a function of temperature. The densities were determined by dividing the weight of the solution by its volume at the same temperature.

TABLE II

Ammonium Sulfate $(NH_4)_2SO_4$

| Concentration % (w/w) | Density, gm/ml | | | |
|---|---|---|---|---|
| | 21.2° C. | 36.0° C. | 47.6° C. | 56.0° C. |
| 30.0 | 1.171 | 1.166 | 1.161 | 1.157 |
| 31.8 | 1.182 | 1.176 | 1.171 | 1.168 |
| 34.0 | 1.194 | 1.189 | 1.184 | 1.180 |
| 35.9 | 1.205 | 1.199 | 1.194 | 1.191 |
| 37.9 | 1.216 | 1.211 | 1.206 | 1.202 |
| 40.1 | 1.229 | 1.223 | 1.219 | 1.215 |
| 42.0 | 1.239 | 1.234 | 1.230 | — |

TABLE III

Ammonium Citrate-Dibasic $(NH_4)HC_6H_5O_7$

| Concentration % (w/w) | Density, gm/ml | | | |
|---|---|---|---|---|
| | 20.3° C. | 36.0° C. | 47.6° C. | 56.0° C. |
| 31.9 | 1.144 | 1.138 | 1.132 | 1.127 |
| 33.3 | 1.150 | 1.144 | 1.138 | 1.133 |
| 36.0 | 1.164 | 1.157 | 1.151 | 1.147 |
| 38.0 | 1.173 | 1.166 | 1.161 | 1.155 |
| 39.9 | 1.183 | 1.176 | 1.171 | 1.167 |
| 41.9 | 1.193 | 1.186 | 1.180 | 1.175 |
| 44.0 | 1.204 | 1.196 | 1.190 | 1.186 |
| 46.0 | 1.212 | 1.205 | 1.200 | 1.195 |

TABLE IV

Ammonium Carbonate

| Concentration % (w/w) | Density, gm/ml | | | |
|---|---|---|---|---|
| | 20.5° C. | 36.0° C. | 47.6° C. | 56.0° C. |
| 10.0 | 1.043 | 1.037 | 1.031 | 1.026 |
| 12.0 | 1.052 | 1.045 | 1.040 | 1.035 |
| 14.0 | 1.062 | 1.054 | 1.048 | 1.043 |
| 16.0 | 1.070 | 1.062 | 1.056 | 1.051 |
| 17.7 | 1.078 | 1.070 | 1.063 | 1.058 |
| 20.0 | 1.088 | 1.080 | 1.073 | 1.067 |

TABLE V

Ammonium Bisulfate $NH_4HSO_4$

| Concentration % (w/w) | Density, gm/ml | | | |
|---|---|---|---|---|
| | 20.3° C. | 36.0° C. | 47.6° C. | 56.0° C. |
| 24.0 | 1.140 | 1.132 | 1.125 | 1.119 |
| 28.0 | 1.165 | 1.156 | 1.149 | 1.144 |
| 32.0 | 1.191 | 1.181 | 1.174 | 1.168 |
| 36.0 | 1.216 | 1.206 | 1.198 | 1.193 |
| 40.0 | 1.242 | 1.232 | 1.224 | 1.219 |

TABLE VI

Ammonium Pentaborate-$(NH_4)B_{10}O_{16}$

| Concentration % (w/w) | Density, gm/ml | | | |
|---|---|---|---|---|
| | 20.8° C. | 36.0° C. | 47.6° C. | 56.0° C. |
| 2.00 | 1.011 | 1.006 | 1.001 | 0.997 |
| 3.00 | 1.017 | 1.012 | 1.008 | 1.004 |
| 3.99 | 1.024 | 1.018 | 1.014 | 1.009 |
| 5.01 | 1.030 | 1.025 | 1.020 | 1.016 |

The densities achieved for ammonium pentaborate, as shown in Table VI, supra, are not sufficient to separate anion and cation resins. However, ammonium pentaborate or other amine pentaborate salts can be employed in admixture with other amine salts to form a solution having a density between the densities of the anion and cation resins so that the anion and cation resins are capable of being separated in accordance with the method of the present invention. It is also believed that techniques are available for obtaining amine pentaborate salt solutions having a density capable of separating the anion and cation resins.

Table VII sets forth the density of an amine salt solution prepared by bubbling carbon dioxide through about 20% v/v aqueous ammonia.

TABLE VII

Composition and Density (at 25° C.) of Mixtures of Aqueous Ammonia and Carbon Dioxide

| $C_{NH_3}$ (%) initial | $CO_2$(gm) added | $C_{NH_3}$ (%)[1] | $C_{NH_3}$ (%)[2] | Moles N / Moles C | density (gm/ml) |
|---|---|---|---|---|---|
| 19.4 | 32.8 ± 0.7 | 16.72 ± 0.04 | 14.2 ± 0.3 | 3.05 ± 0.07 | 1.067 |
| 19.5 | 34.3 ± 0.7 | 16.72 ± 0.04 | 14.8 ± 0.3 | 2.93 ± 0.06 | 1.073 |
| 19.7 | 37.0 ± 0.7 | 16.6 ± 0.1 | 15.8 ± 0.3 | 2.72 ± 0.06 | 1.083 |
| 18.9 | 41.1 ± 0.6 | 15.69 ± 0.03 | 17.1 ± 0.2 | 2.37 ± 0.03 | 1.106 |
| 18.8 | 43.0 ± 0.7 | 15.53 ± 0.03 | 17.9 ± 0.03 | 2.24 ± 0.04 | 1.114 |
| 18.8 | 46.4 ± 0.7 | 15.31 ± 0.03 | 19.1 ± 0.3 | 2.07 ± 0.03 | 1.128 |
| 18.9 | 47.6 ± 0.5 | 15.26 ± 0.04 | 19.5 ± 0.2 | 2.03 ± 0.02 | 1.132 |
| 19.1 | 49.7 ± 0.6 | 15.24 ± 0.05 | 20.0 ± 0.2 | 1.97 ± 0.02 | 1.139 |
| 18.9 | 49.2 ± 0.6 | 15.16 ± 0.05 | 20.0 ± 0.2 | 1.96 ± 0.02 | 1.140 |

[1] $C_{NH_3}$ is the analytical (i.e., total) concentration of $NH_3$
[2] $C_{CO_2}$ is the analytical (i.e., total) concentration of $CO_2$ A schematic flow diagram of a process embodying features of the present invention is illustrated in the sole Figure. With reference to the Figure, exhausted mixed resins in a water treatment zone 10 are transferred to a separation zone 12. The manner of transferring resins between zones is familiar to those skilled in the art. Exemplary resin transfer techniques employ water pressure, air pressure, and combinations thereof.

A backwash step can be optionally employed in the separation zone 12 to remove contaminants from the exhausted mixed resins. As used herein, the term "contaminants" includes, but is not necessarily limited to, resin fines and suspended corrosion products, typically iron and copper oxides. Although the backwashing procedure can result in the partial separation of the resins into an anion layer and a cation layer in the separation zone 12, this separation is inadequate for many water polishing systems.

An amine salt solution is introduced into the separation zone 12 for the purposes of separating the anion and cation resins. To avoid exposing the resins to osmotic shock, it is preferred that an initial amine salt solution be introduced into the separation zone 12. The initial amine salt solution has a density less than the densities of the anion and cation resins. The density of the amine salt solution being introduced into the separation zone 12 is increased over a period of time so that the amine salt solution being introduced into the separation zone 12 has a density greater than the density of the anion resin and less than the density of the cation resin. While the density of the influent amine salt solution is being increased, the amine salt solution is allowed to exit from the separation zone 12.

The amine salt solution is preferably an ammonium sulfate solution. The ammonium sulfate solution can be introduced into the separation zone 12 by mixing dilute sulfuric acid with dilute ammonia to form a solution containing about 1 to about 2 percent weight/weight (% w/w) ammonium sulfate. The concentration of the ammonium sulfate in the solution can be gradually increased by increasing the amount of sulfuric acid and ammonia with respect to the amount of dilution water being employed. This increase can continue up to the formation of a solution having a desired final ammonium sulfate concentration. An exemplary final solution comprises about 25 to about 35% w/w ammonium sulfate. However, after reaching an ammonium sulfate concentration of about 12% w/w, it is preferred that saturated ammonium sulfate be used to further increase the concentration of the influent ammonium sulfate solution to the separation zone 12. By using saturated ammonium sulfate, the amount of heat generated during the formation of the desired ammonium sulfate solution concentration is reduced.

After reaching the desired amine salt solution concentration, the amine salt solution is preferably not permitted to exit the separation zone 12. Accordingly, the level of the amine salt solution in the separation zone 12 rises. Because the amine salt solution has a density greater than the density of the anion resin and less than the density of the cation resin, the anion resin floats and the cation resin sinks in the solution. As the height of the solution in the separation zone 12 increases, substantially all of the anion resin is lifted above substantially all of the cation resin in the separation zone 12 and a layer substantially devoid of anion and cation resins is formed between the separated resins. To avoid entraining any anion resin in the cation resin, it is preferred to backwash the amine salt solution into the separation zone 12. It is also preferred that the amine salt solution be slowly backwashed into the separation zone. The slow introduction of the amine salt solution reduces pushing or raising of the cation resin into the layer between the anion and cation resins.

In addition to separating the anion and cation resins from each other, the amine salt solution at least partially regenerates the cation resin.

A composition comprising the anion resin, the cation resin, and the amine salt solution having a density greater than the density of the anion resin but less than the density of the cation resin is formed in this step. To aid in separating the anion and cation resins, it is preferred that the composition be allowed to sit for a period of time to allow any anion resin entrapped in the cation resin to float and any cation resin entrapped in the anion resin to sink. An exemplary period of time is at least about ten minutes.

The anion and cation resins are then removed from the separation zone 12 and placed in the anion and cation regeneration zones 14 and 16, respectively. The anion resin and cation resin are next rinsed with water to remove the amine salt solution therefrom. To ensure optimum removal of the amine salt solution from the anion and cation resins, the water rinse is preferably a two-step procedure wherein each resin is first slowly rinsed with water and then rinsed with water at a faster rate. Typically, the fast rinse step is conducted at a rate of about two to about three times the rate of the slow rinse step. In addition, the rates at which the anion resin is rinsed in the slow and fast rinse steps are generally slower than the rates at which the cation resin is rinsed in the corresponding steps.

The anion resin in the anion regeneration zone 14 can be regenerated by any anion regeneration technique known to those skilled in the art. Similarly, the cation resin in the cation regeneration zone 16 can be regenerated by any cation regeneration technique known to those skilled in the art. Exemplary techniques for regenerating anion and cation resins are disclosed in U.S. Pat. No. 4,511,657 and U.S. application Ser. No. 045,079, filed May 1, 1987, both of these documents being incorporated herein by this reference.

To remove the regenerating solutions from the regenerated resins, the regenerated anion and cation resins in the cation and anion regeneration zones 14 and 16, respectively, are rinsed with water. This water rinse procedure is, for the reasons discussed above with respect to removing the amine salt solution from the resins, preferably also conducted in a slow-fast, two step procedure. The rinsed anion and cation resins are next preferably backwashed with water to further assure that no residual regenerating solution remains in either the anion or cation regeneration zone 14 or 16.

The regenerated and rinsed anion and cation resins are transferred to a recombination zone 18. The anion and cation resins are thoroughly mixed by passing air through the recombination zone 18. The mixed resins are next rinsed with water to further lower the conductivity of the effluent water to the operating conductivity level. Exemplary operating conductivity levels for fossil and nuclear generating plants are 0.1 and 0.07 $\mu$MHO/cm, respectively. The mixed resins are then transferred to the water treatment zone 10. The service zone is now ready to be put back into operation.

With respect to the temperatures at which the method of the present invention is conducted it is preferred that the operating temperature be below about 125° F. to avoid damaging the anion resin. In addition, to avoid cracking the resins, it is preferred that the operating temperature be above freezing. Because the specific gravity of a solution increases with decreasing temperature, the operating temperature is also preferably low. Furthermore, to avoid subjecting the anion and cation resins to osmotic shock, it is preferred to conduct the method of the instant invention at substantially constant or slowly changing temperatures.

In a first exemplary embodiment of the present invention, the procedures performed in the separation zone 12, cation regeneration zone 16, and recombination zone 18 are performed in the same vessel. In this embodiment the separation step remove s substantially all of the anion resin from an upper portion of the vessel and transfers the anion resin to the anion regeneration zone 14. Nevertheless, it is preferred that additional amine salt solution be introduced into the vessel and any residual anion resin in the vessel be allowed to be floated by the amine salt solution. The floated anion resin is then transferred from the upper portion of the vessel to the anion regeneration zone 14.

In a second exemplary embodiment of the present invention, the procedures performed in the separation zone 12, anion regeneration zone 14, and recombination zone 18 are performed in the same vessel. In this embodiment the separation step removes substantially all of the cation resin from the bottom of the vessel and transfers the cation resin to the cation regeneration zone 16. Optionally, additional amine salt solution can be introduced into the vessel to dislodge any residual cation resin in the vessel. The dislodged cation resin can then be transferred from the bottom of the vessel to the cation regeneration zone 16.

Generally, the anion resin has a density less than the density of the cation resin. However, it is believed that there are certain situations wherein the anion resin can have a density greater than the density of the cation resin. Nevertheless, as long as the densities of the anion and cation resins differ, the process of the instant invention can be employed to separate the anion and cation resins.

Accordingly, the method of the instant invention is capable of substantially separating the cation and anion resins present in a mixed bed without adversely exhausting either resin. For example, if ammonium sulfate is employed as the amine salt solution, the cation resin is regenerated to the ammonium form. The ammonium form of the cation resin is typically used in a mixed bed to treat water in fossil fuel power plants. Even if it is desired to have the cation resin in the hydrogen form, as for example, in nuclear power plants, the cation resin can be successfully further regenerated to the hydrogen form with, for example, sulfuric acid. In addition, any ammonium leakage from the cation resin is not detrimental because ammonia is typically added to control the pH of the effluent water from the mixed bed.

With respect to the anion resin, when ammonium sulfate is employed as the amine salt solution, the anion resin is put into the sulfate form. Sulfate ions are commonly used to strip anions, e.g., chloride, from anion resins. The sulfate exhausted anion resin is readily regenerated with sodium hydroxide to the hydroxyl form. Furthermore, any residual sulfate on the anion resin does not contribute to any sulfate leakage because these sulfate ions are strongly held by the anion resin and are not displaced by ions that are typically present in the influent water to the mixed bed.

In sharp contrast, in the prior art process sulfate leakage can arise from the anion resin that is entrained with the cation resin. It is believed that sulfate leakage is present in the prior art process because when the cation resin is regenerated with sulfuric acid the entrained anion resin is exhausted to the sulfate and bisulfate forms. The exhausted anion resin in the prior art process is not regenerated before being returned to service. Accordingly, after being returned to service, the weakly held bisulfate ions are driven off the anion resin by ions, e.g., hydroxyl, that are present in the influent water.

In addition, in accordance with the present invention neither the size nor the bulk volume of either resin is employed as an operable parameter to separate the anion and cation resins. Instead, the different densities of the anion and cation resins are employed to separate the resins. Accordingly, the size and bulk volume of the resins used in the mixed bed are not restricted by the method of the present invention.

Although the present invention has been described in considerable detail with reference to certain preferred versions thereof, other versions are possible. For example, the same vessel can be used to house the water treatment zone 10, separation zone 12, the recombination zone 18, and either the anion regeneration zone 14 or the cation regeneration zone 16. In addition, the recombined anion and cation resins can optionally be transferred to a storage zone prior to being introduced into the water treatment zone 10. Alternatively, the recombination zone and storage zone can be located in the same vessel. Therefore, the spirit and scope of the appended claims should not necessarily be limited to the description of the preferred versions contained herein.

What is claimed is:

1. A method for separating and regenerating a mixed bed of anion and cation resins comprising the steps of:
   (a) introducing an amine salt solution into a separation zone containing the mixed bed of resins, the mixed bed of resins comprising at least about 25% v/v cation resin and the amine salt solution having a density greater than the density of the anion resin and less than the density of the cation resin, whereby (i) the anion resin floats and the cation resin sinks in the solution and (ii) the cation resin is at least partially regenerated by the amine salt solution;
   (b) separating the anion and cation resins so that substantially all of the anion resin occupies an anion regeneration zone and substantially all of the cation resin occupies a cation regeneration zone;
   (c) rinsing the cation resin in the cation regeneration zone and the anion resin in the anion regeneration zone to displace the amine salt solution from the resins; and
   (d) regenerating the anion resin
   wherein the amine salt in the amine salt solution has a cation moiety and an anion moiety, the cation moiety being selected from the group consisting of hydrazine, cyclohexamine, morpholine and ammonium, and mixtures thereof, and the anion moiety being selected from the group consisting of sulfate, bisulfate, carbonate, bicarbonate, citrate, nitrate, oxalate, acetate and pentaborate, and mixtures thereof.

2. The method of claim 1 wherein the mixed bed of resins comprises at last about 50% v/v cation resin.

3. The method of claim 1 wherein prior to step (a) the mixed bed of anion and cation resins is transferred from a service zone to the separation zone.

4. The method of claim 1 comprising the additional step of further regenerating the cation resin after step (a).

5. The method of claim 1 wherein the separation zone and the cation regeneration zone are located in the same vessel.

6. The method of claim 5 wherein after step (b) the method further comprising the steps of (i) introducing additional amine salt solution into the cation regeneration zone, (ii) allowing any residual anion resin in the cation regeneration zone to be floated by the solution, and (iii) transferring substantially all of the floated residual anion resin from the cation resin regeneration zone to the anion resin regeneration zone.

7. The method of claim 1 wherein the separation zone and the anion regeneration zone are located in the same vessel.

8. The method of claim 1 wherein prior to step (a) the mixed resins are backwashed, the backwashing step being employed to remove contaminants from the resins.

9. The method of claim 1 further comprising the steps of (i) introducing an initial amine salt solution into the mixed resins, the initial amine salt solution having a density less than the densities of the anion and cation resins, and (ii) increasing the density of the amine salt solution being introduced into the mixed resins so that the amine salt solution being introduced into the mixed resins has a density of the amine salt solution of step (a).

10. The method of claim 1 wherein the cation moiety is ammonium.

11. The method of claim 1 wherein the anion moiety is selected from the group consisting of sulfate, bisulfate, carbonate, bicarbonate and citrate.

12. The method of claim 1 wherein the amine salt solution is an ammonium sulfate solution.

13. A method for separating a mixture of anion and cation resins comprising the step of combining the mixture in a separation zone with an amine salt solution, the mixture comprising at least about 25% v/v cation resin and the amine salt solution having a density greater than the density of the anion resin and less than the density of the cation resin whereby the anion resin floats and the cation resin sinks in the solution so that substantially all of the anion resin can be separated from substantially all of the cation resin wherein the amine salt in the amine salt solution has a cation moiety and an anion moiety, the cation moiety being selected from the group consisting of hydrazine, cyclohexamine, morpholine and ammonium, and mixtures thereof, and the anion moiety being selected from the group consisting of sulfate, bisulfate, carbonate, bicarbonate, citrate, nitrate, oxalate, acetate and pentaborate, and mixtures thereof.

14. The method of claim 13 wherein the mixed bed of resins comprises at least about 50% v/v cation resin.

15. The method of claim 13 further comprising the step of removing substantially all of the anion resin from the separation zone to an anion regeneration zone, and thereby separating the anion resin from the cation resin.

16. The method of claim 15 further comprising the steps of (i) introducing additional amine salt solution into the separation zone, (ii) allowing any residual anion resin in the separation zone to be floated by the solution, and (iii) removing substantially all of the floated residual anion resin from the separation zone to the anion regeneration zone, thereby separating substantially all residual anion resin from the cation resin.

17. The method of claim 13 further comprising the step of removing substantially all of the cation resin from the separation zone to a cation regeneration zone and thereby separating the cation resin from the anion resin.

18. The method of claim 13 wherein, prior to step of combining the mixture with the amine salt solution, the method further comprises the steps of (i) introducing an initial amine salt solution into the separation zone wherein the initial amine salt solution has a density less than the densities of the anion and cation resins, and (ii) increasing the density of the amine salt solution being introduced into the separation zone so that the amine salt solution being introduced into the separation zone has a density greater than the density of the anion resin and less than the density of the cation resin.

19. A method for separating a mixture of anion and cation resins comprising the step of combining the mixture in a separation zone with an amine salt solution, the mixture comprising at least about 25% v/v cation resin and the amine salt solution having a density between the densities of the anion and cation resins whereby one resin floats and the other resin sinks in the solution so that substantially all of the anion resin can be separated from substantially all of the cation resin, the method further comprising the step of regenerating the anion resin, and wherein the amine salt in the amine salt solution has a cation moiety and an anion moiety, the cation moiety being selected from the group consisting of hydrazine, cyclohexamine, morphaline and ammonium, and mixtures thereof, and the anion moiety being selected from the group consisting of sulfate, bisulfate, carbonate, bicarbonate, citrate, nitrate, oxalate, acetate, and pentaborate, and mixtures thereof.

20. A composition produced during the separation of a mixture of cation and anion resins by the process of claim 1 the composition comprising:
 (a) an anion resin;
 (b) a cation resin, the cation resin comprising at least 25% v/v of the mixture of resins, and
 (c) an amine salt having a density greater than the density of the anion resin and less than the density of the cation resin whereby the anion resin floats and the cation resin sinks in the solution.

21. The composition of claim 20 wherein the cation resin comprises at least about 50% v/v of the mixture of resins.

22. The composition of claim 20 wherein the cation moiety is ammonium.

23. The composition of claim 21 wherein the anion moiety is selected from the group consisting of sulfate, bisulfate, carbonate, bicarbonate and citrate.

24. The composition of claim 20 wherein the amine salt solution is an ammonium sulfate solution.

25. A method as claimed in claim 1 wherein the step of introducing an amine salt solution comprises introducing the amine salt solution into the separation zone without any prior performance of both steps of backwash separation oft he resin and withdraw of backwash separated resin from the mixed bed.

26. The method of claim 13 or 19 in which the mixture and amine salt solution are combined without any prior performance of both steps of backwash separation of resins and withdraw of backwash separated resin from the mixture.

* * * * *